United States Patent
Chen et al.

[19]

[11] Patent Number: 5,905,830
[45] Date of Patent: May 18, 1999

[54] DEVICE FOR COUPLING A HIGH INTENSITY POINT SOURCE TO A FIBER BUNDLE

[75] Inventors: Chingfa Chen, West Covina; Fred P. Paulino, Westminster; Kenneth K. Li, Arcadia; Douglas M. Brenner, Los Angeles, all of Calif.

[73] Assignee: Cogent Light Technologies, Inc., Santa Clarita, Calif.

[21] Appl. No.: 08/985,242

[22] Filed: Dec. 4, 1997

Related U.S. Application Data

[62] Division of application No. 08/725,480, Oct. 4, 1996.

[51] Int. Cl.⁶ ........................................................ G02B 6/38
[52] U.S. Cl. .......................... 385/72; 385/116; 385/117; 385/54
[58] Field of Search ................................. 385/53–60, 66, 385/68–74, 46, 115, 116, 117

[56] References Cited

U.S. PATENT DOCUMENTS

| | | | |
|---|---|---|---|
| 4,461,538 | 7/1984 | Breed, III et al. .................. | 385/88 |
| 4,639,077 | 1/1987 | Dobler ................................ | 385/92 |
| 4,773,723 | 9/1988 | Cuda .................................. | 385/89 |
| 4,944,567 | 7/1990 | Kuper et al. ....................... | 385/31 |
| 5,016,963 | 5/1991 | Pan .................................... | 385/33 |
| 5,031,994 | 7/1991 | Emmons ............................. | 350/96.2 |
| 5,094,518 | 3/1992 | Musk ................................. | 385/35 |
| 5,109,466 | 4/1992 | Seike et al. ........................ | 385/137 |
| 5,179,610 | 1/1993 | Milburn et al. .................... | 385/92 |
| 5,274,723 | 12/1993 | Komatsu ............................ | 385/92 |
| 5,680,492 | 10/1997 | Hopler et al. ..................... | 385/119 |

FOREIGN PATENT DOCUMENTS

| | | |
|---|---|---|
| 0251623 | 1/1988 | European Pat. Off. . |
| 0415625 | 3/1990 | European Pat. Off. . |
| 0361751 | 4/1990 | European Pat. Off. . |
| 0400856 | 12/1990 | European Pat. Off. . |
| 3744367 | 8/1989 | Germany . |
| 62-10608 | 1/1987 | Japan . |
| 2143207 | 6/1990 | Japan . |
| 9535517 | 12/1995 | WIPO . |
| 9705510 | 2/1997 | WIPO . |

*Primary Examiner*—Hung N. Ngo
*Attorney, Agent, or Firm*—Rothwell, Figg, Ernst & Kurz, p.c.

[57] ABSTRACT

A method and apparatus which can couple a high intensity point source, such as from a single fiber, to a fiber bundle. A bundle of fibers is fed though a hole in the light post. A removable potting compound is applied to the tip of the bundle to hold the fibers together for polishing. The tip of the bundle is polished and then the potting compound is removed from the tip of the bundle. A window is placed over a light inlet of the hole so as to seal the bundle. A point source cable introduces a point source of light to the bundle of fibers. A ferrule is provided around the point source cable, having a diameter sized corresponding to a diameter of said light post. The ferrule and the bundle of fibers are clamped with a split sleeve which extends therebetween.

9 Claims, 3 Drawing Sheets

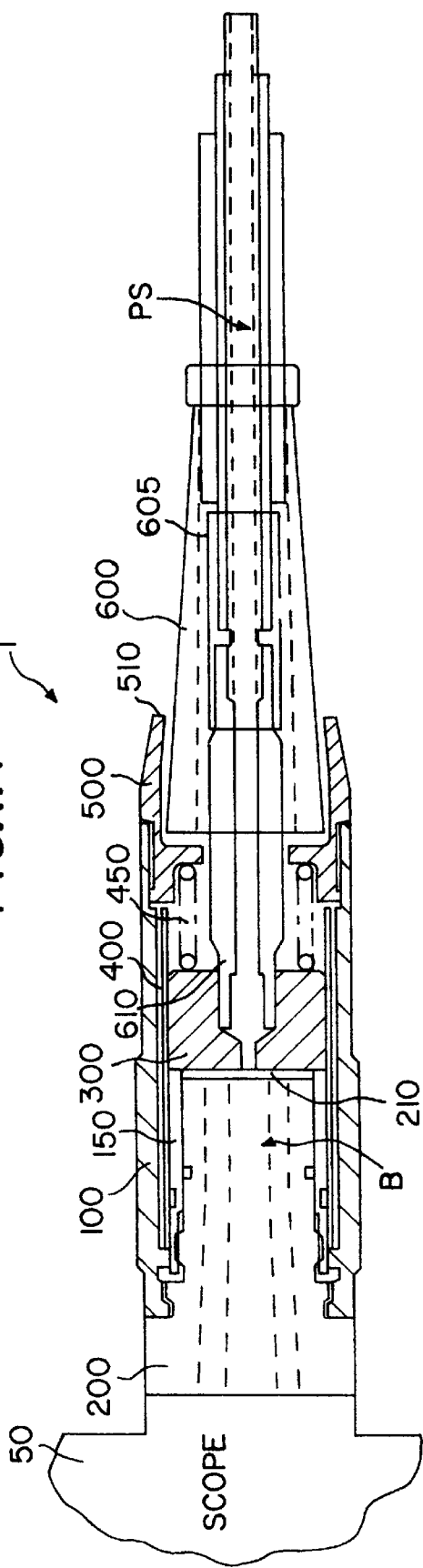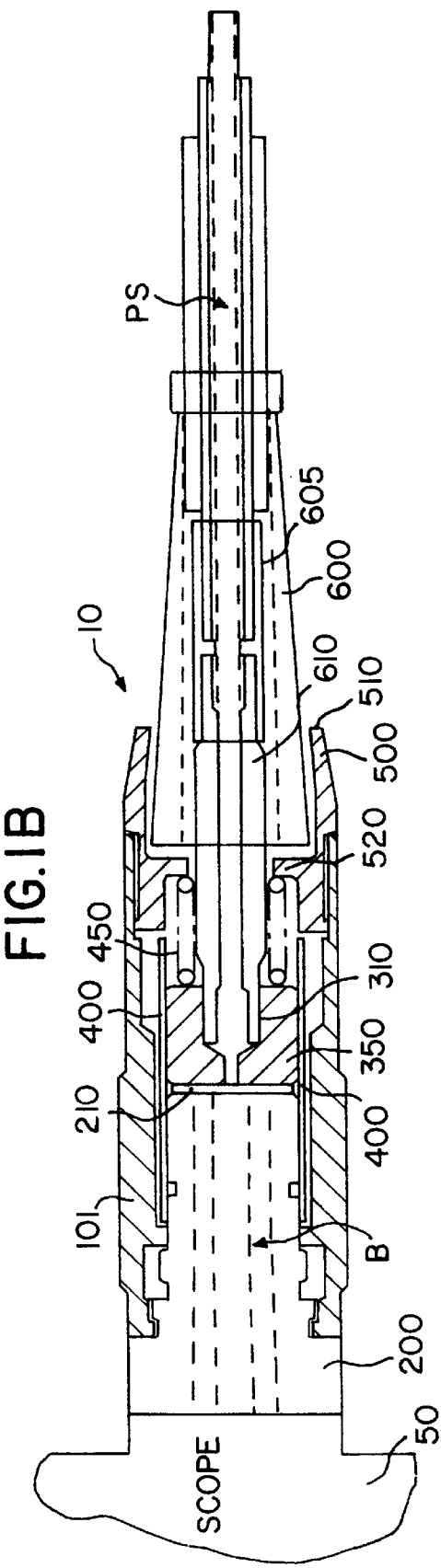

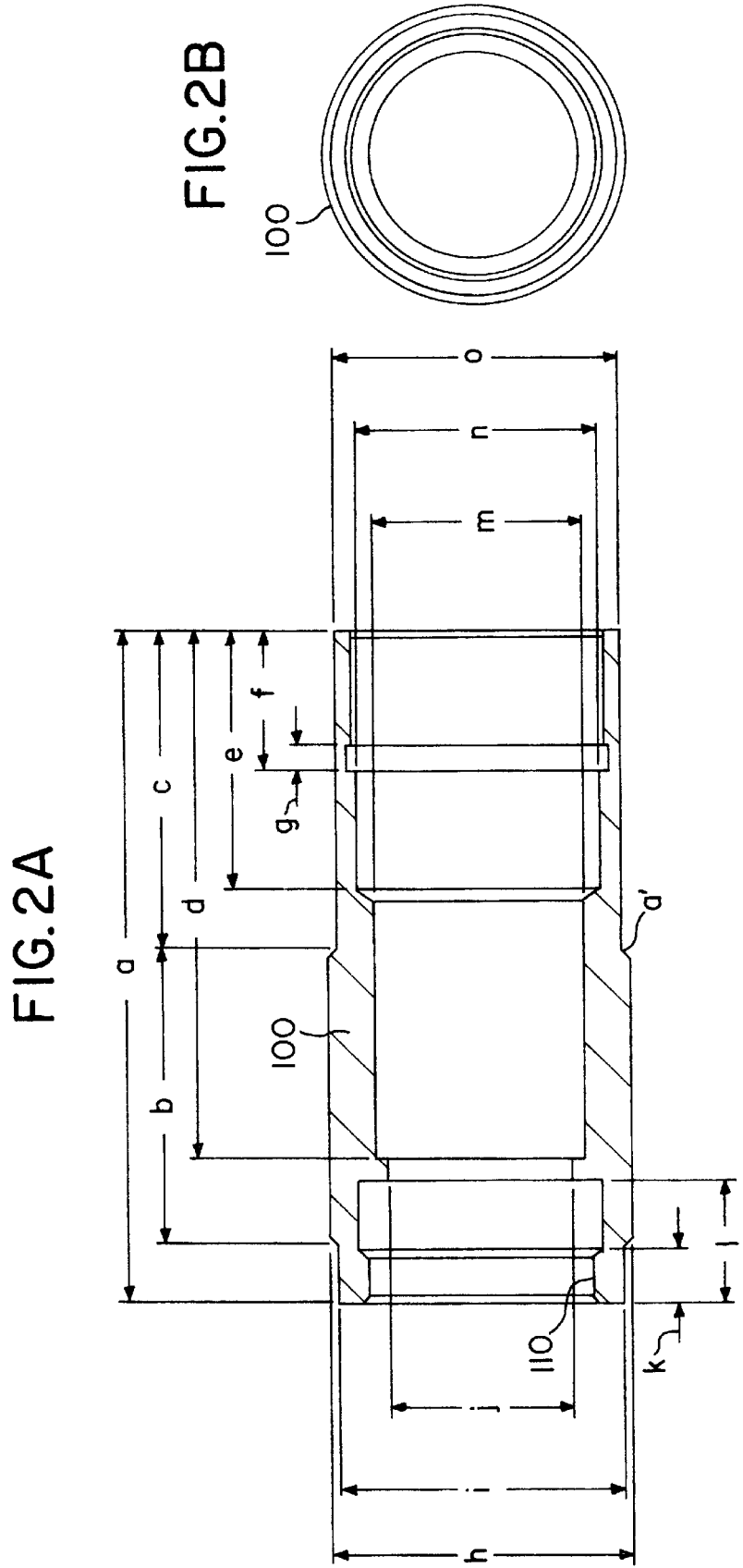

DEVICE FOR COUPLING A HIGH INTENSITY POINT SOURCE TO A FIBER BUNDLE

This is a divisional of application Ser. No. 08/725,480, filed Oct. 4, 1996.

BACKGROUND OF THE INVENTION

1. Field of the Invention

The present invention relates to techniques for coupling light from a point source, such as a single fiber, to an illumination fiber bundle, such as for an endoscope.

2. Description of the Background Art

Known techniques used for coupling light from a source cable to an illumination fiber bundle inside rigid or flexible endoscopes, for example, include (a) butt coupling or (b) coupling through a cone-shaped glass rod to focus the light before coupling it into the endoscope.

In either of the above cases, the fiber endfaces on both sides are epoxied and polished to the optical quality finish. The epoxy used typically has a 1–10% light absorption coefficient. The small percent of light which is absorbed by the epoxy combined with its poor heat transfer characteristics can gradually accumulate enough heat to melt the fiber endface. As a result, this prevents the use of a high power density light input to couple more light into the endoscope.

SUMMARY OF THE INVENTION

The present invention provides a new approach for connecting a point source, such as a single fiber, to an illumination fiber bundle, such as for an endoscope, and involves a connector design which can enable the coupling of a high optical power density light to the fiber bundle. The present invention can avoid melting of the fibers and can eliminate the need for epoxy at the interfaces of the fiber bundles, which in turn can increase the bundle power handling capacity, such as to be in accordance with the material limitations of the fibers.

A first aspect of the invention involves a novel method which can produce a high packing density epoxyless fiber bundle, using a fiber bundle polish and seal technique. As a result, it is possible to obtain good optical quality endfaces to achieve a high fiber-to-fiber coupling efficiency. A preferred method which can achieve this includes: bundling illumination fibers of an endoscope or the like and feeding the bundle through a hole in a light post, the area ratio of total fiber endface to the cross section of the hole determining the fiber packing factor and the overall maximum coupling efficiency; then applying a removable potting compound to the tip of the bundle to hold the fibers together for polishing; and after the desired polishing quality is achieved, removing the potting compound such as by immersing the same into solvents or other appropriate agents. The bundle assembly is then dried, and a glass window is placed thereover so as to seal the bundle to prevent any contamination. The potting compound can be, for example, an epoxy, a wax, or an adhesive.

By eliminating potting compound, such as epoxy, near the fiber bundle's interface, the bundle's power handling capability is only limited by the melting temperature of the fibers. The coupling loss depends on the bundle's packing factor and is converted into heat which dissipates through the surrounding metal of the light post, preventing overheating of the fibers.

The first aspect of the invention also contemplates a method of coupling a high intensity point source to a fiber bundle, which includes the steps of a) providing a light post having a hole for receiving a bundle of fibers; b) feeding a bundle of fibers through the hole in the light post; c) applying a removable potting compound to the tip of the bundle to hold the fibers together for polishing; d) polishing the tip of the bundle; e) removing the potting compound from the tip of the bundle; and f) locating a point source cable so as to introduce a point source of light to the bundle of fibers.

A second aspect of the invention utilizes a connector which enables a repeatable high efficiency coupling and which can maintain a high degree of alignment accuracy between the source cable and the illumination bundle. The second aspect of the invention preferably includes a fiber ferrule surrounding a point source cable, the ferrule having an outer diameter of about the same size as the outer diameter of the light post. A split sleeve surrounds the ferrule and the light post to hold their outer surfaces for alignment. The split sleeve is preferably housed inside a cylinder, or tubular body member, to cover and prevent a loss of elasticity of the split sleeve over time. The ferrule on the source cable is preferably spring-loaded to maintain a positive contact between the ferrule and the light post (or another ferrule around the light post), the contact pressure being adjustable to prevent damaging of the interfaces between the respective members.

This structure also enables a freedom of rotation between the source cable and, for example, an endoscope without losing coupling efficiency.

The second aspect of the invention also contemplates a method of coupling a high intensity point source to a fiber bundle, which includes the steps of: a) providing a light post having a hole for receiving a bundle of fibers, and providing a bundle of fibers in said hole; b) providing a point source cable having a diameter substantially smaller than that of is the bundle of fibers; and c) clamping both the ferrule and the bundle of fibers with a split sleeve which extends therebetween.

It is contemplated that according to the present invention, the point source cable can include a single fiber optic or a micro bundle which emit a point source, or generally a point source, in contrast to a standard bundle of fibers.

The above and other advantages, features and aspects of the invention will be more readily perceived from the following description of the preferred embodiments thereof taken together with the accompanying drawings and claims.

BRIEF DESCRIPTION OF THE DRAWINGS

The present invention is illustrated by way of example and not limitation in the accompanying drawings, in which like references indicate like parts, and in which:

FIG. 1(A) is a cross-sectional side view of a first embodiment of a device according to the present invention;

FIG. 1(B) is a view similar to FIG. 1(A) of a second embodiment of the invention having a modified tubular body;

FIG. 2(A) is a cross-sectional side view of the tubular body according to the second embodiment shown in FIG. 1(B), and FIG. 2(B) is an end view of the tubular body from the right side of FIG. 2(A);

DETAILED DESCRIPTION OF THE PREFERRED EMBODIMENTS

Figure 3A:
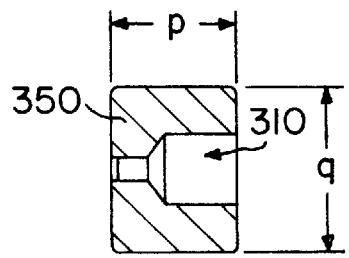
FIG. 3(A) is a cross-sectional side view of a ferrule according to the second embodiment shown in FIG. 1(B)
Figure 3B:
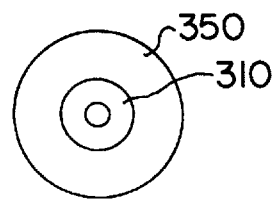
FIG. 3(B) is an end view of the ferrule from the right side of FIG. 3(A)

FIGS. 1(A) and 1(B) illustrate two embodiments of the assembled device according to the present invention. The devices in these two embodiments differ mainly with respect to the inclusion of two ferrules 150 and 300 in FIG. 1(A) and one ferrule 350 in FIG. 1(B), as discussed further hereinbelow.

As shown in FIG. 1(B), a point source cable PS is coupled to a light post 200 attached to a device, such as an endoscope 50, via a coupling device 10. The point source cable PS can be, for example, a single fiber optic or a micro bundle about 1 mm in diameter. The coupling device 10 includes a ferrule 350 having a receiving hole 310, best shown in FIG. 3(A), for receiving an end of the point source cable PS. The ferrule 350 has a diameter about the same size as a diameter across the light post 200, whereby a split sleeve 400, shown in FIG. 4(A), can surround and hold both the ferrule 350 and the light post 200. A body 101, having a generally tubular elongated form, surrounds the split sleeve 400 and is preferably attached to the light post 200, such as by threads 110 or the like. The opposite end of the tubular body 101 preferably has a nut member 500 affixed thereto, such as by threads or the like. The nut member 500 has a converging input end 510 and an annular spring abutment portion 520. A compression spring 450 is located between the ferrule 350 and the portion 520 so as to bias the ferrule 350 in the direction of the light post. A strain relief member 600 surrounds the point source cable PS and fits within the converging input end 510 of the nut member so as to support and protect the cable PS. As shown, the point source cable PS can also include a fiber subassembly 605 and a surrounding member 610 around the innermost end; the particular cable structure can be selected from that known in the art.

The embodiment illustrated in FIG. 1(A) is similar to the embodiment of FIG. 1(B) except that the ferrule 300 has a diameter greater than that of the light post 200 and an additional ferrule 150 surrounds the light post 200. Accordingly, the split sleeve 400 acts to press against both the ferrule 150 and the ferrule 300 in a manner similar to the embodiment shown in FIG. 1(B). The remaining features in FIG. 1(A) are similar to that shown in FIG. 1(B). The members 100, 300, 400, and 500 are preferably made from a rigid material, such as stainless steel, while the member 600 is preferably made with a flexible material such as a synthetic resin, for example SANTOPRENE.

In the assembly of the devices 1 and 10, a fiber bundle B (shown in broken lines) from an endoscope 50, or the like, is directed axially through a hole in the light post 200 to the right end of the light post shown in FIGS. 1(A) and 1(B). The fiber bundle B can have any suitable diameter. For example, current endoscopes have fiber bundles of 3–6 mm diameter. The fibers can be bundled in the light post 200 in a manner discussed above so as to polish the fibers without having a potting compound, such as epoxy, thereon. Thereafter, as discussed above, a window 210 made of, e.g., glass can be used to cover the bundle.

Figure 4A:
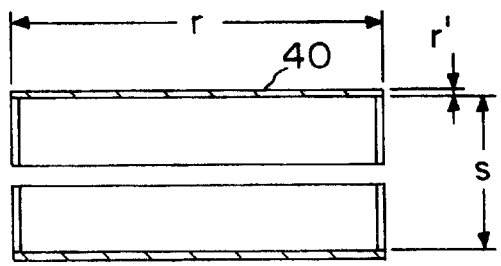
FIG. 4(A) is a cross-sectional side view of a split sleeve as shown in the second embodiment of FIG. 1(B)
Figure 4B:
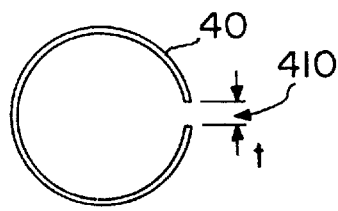
FIG. 4(B) is an end view shown from the right side of FIG. 4(A)
Figure 5A:
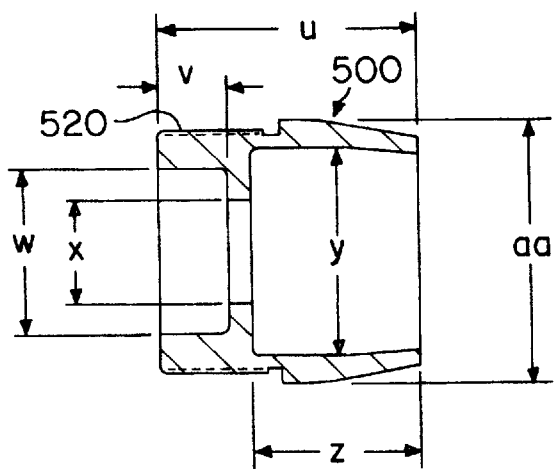
FIG. 5(A) is a cross-sectional side view of a nut member.
Figure 5B:
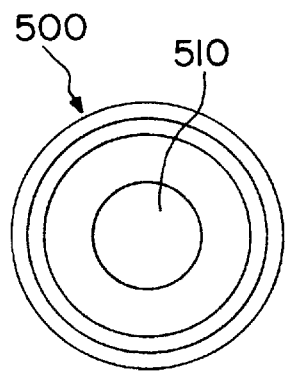
FIG. 5(B) is an end view from the right side of FIG. 5(A)
Figure 6A:
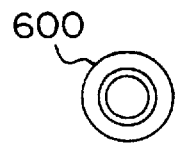
FIG. 6(A) is an end view of the strain relief member.
Figure 6B:
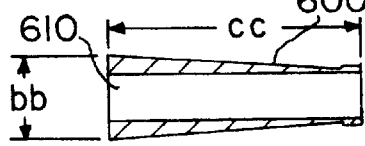
FIG. 6(B) is a cross-sectional side view of the member shown in FIG. 6(A).

It should be understood that the point source emitted from the point source cable PS is preferably emitted from the left side of the ferrules 300, 350 in FIGS. 1(A)–1(B). That is, the single fiber, or micro fiber bundle, preferably extends a close proximity to or against the window 210. The FIGS. are labeled to show an example, non-limiting, embodiment having sizes and relative dimensions as follows:

| Reference | Dimension in Inches |
|---|---|
| FIG. 2(A) | |
| a | 1.14 |
| a' | 2 × 45° × .015 |
| b | .50 |
| c | .54 |
| d | .890 |
| e | .435 |
| f | .235 |
| g | .045 |
| h | 0.5 |
| i | 0 472 |
| j | 0.302 ± .002 |
| k | .085 |
| l | .205 |
| m | 0.346 ± .002 |
| n | 0.404 |
| o | 0.472 |
| FIG. 3(A) | |
| p | .220 |
| q | 0.2975 ± .0005 |
| FIG. 4(A) | |
| r | .65 |
| r' | .0100 ± .0005 |
| s | 0.284 ± .003 |
| FIG. 4(B) | |
| t | .04 |
| FIG. 5(A) | |
| u | .460 |
| v | .125 |
| w | 0.302 ± .002 |
| x | 0.190 |
| y | 0.378 |
| z | .295 |
| aa | 0.472 |
| FIG. 6(B) | |
| bb | 0.340–.370 |
| cc | 1.05–1.10 |

While the present invention has been shown and described with reference to preferred embodiments presently contemplated as best modes for carrying out the invention, it should be understood that various changes may be made in adapting the invention to different embodiments without departing from the broader inventive concepts disclosed herein and comprehended by the claims which follow.

What is claimed is:

1. A device for coupling a point source cable and a fiber bundle, comprising:

a) a light post having a hole for receiving a bundle of fibers;

b) a bundle of fibers within said hole;

c) a point source cable for introducing a point source of light to the bundle of fibers;

d) a ferrule surrounding the point source cable and having a diameter sized corresponding to a diameter of said light post; and e) a split sleeve extending over and clamping both the ferrule and the light post containing the bundle of fibers therein.

2. The device of claim 1, further including a tubular body around the split sleeve.

3. The device of claim 2, further including a nut at an end of the body opposite to the light post.

4. The device of claim 3, further including a compression spring between said ferrule and said nut such that said ferrule is biased towards said light post, said nut having an opening therethrough for receiving said point source cable.

5. The device of claim 4, further including a ferrule surrounding said light post with said split sleeve surrounding both said light post ferrule and said ferrule around said point source cable.

6. The device of claim 1, wherein the point source cable is a single fiber.

7. The device of claim 1, wherein the point source cable is a micro fiber bundle.

8. The device of claim 1, wherein said bundle of fibers have a polished tip which is substantially free from potting compound.

9. The device of claim 1, wherein no potting compound is present between the bundle of fibers and said point source cable.

* * * * *